United States Patent [19]
Hill

[11] Patent Number: 6,022,009
[45] Date of Patent: Feb. 8, 2000

[54] TOP LOAD THREADED BOLT ASSEMBLY

[75] Inventor: Benny R. Hill, Fort Worth, Tex.

[73] Assignee: Northrop Grumman Corporation, Los Angeles, Calif.

[21] Appl. No.: 08/853,958

[22] Filed: May 9, 1997

[51] Int. Cl.$^7$ .................................................. B23Q 1/00
[52] U.S. Cl. ................. 269/47; 269/289 R; 269/292; 269/310
[58] Field of Search ................. 269/47, 289 R, 269/292, 297, 310, 312

[56] References Cited

U.S. PATENT DOCUMENTS

| | | | |
|---|---|---|---|
| 1,082,252 | 12/1913 | Ackermann . | |
| 2,239,125 | 4/1941 | Summers | 24/221 |
| 2,465,742 | 3/1949 | Nalle | 16/42 |
| 2,922,211 | 1/1960 | Boyd | 24/221 |
| 3,018,127 | 1/1962 | Dobrosielski et al. | 292/251 |
| 3,081,808 | 3/1963 | Rosan et al. | 151/41.73 |
| 3,729,185 | 4/1973 | Roeske | 269/310 |
| 3,848,495 | 11/1974 | Youra | 269/297 |
| 4,720,223 | 1/1988 | Neights et al. | 411/11 |
| 4,801,231 | 1/1989 | Everman | 411/432 |
| 4,946,126 | 8/1990 | Williams | 248/476 |
| 5,232,323 | 8/1993 | Baehre | 411/178 |
| 5,579,862 | 12/1996 | Bowden et al. | 180/287 |

OTHER PUBLICATIONS

Back–Bolt Assembly Design Information, DS–004.002, Vought Aircraft Company, a Division of Northrop Grumman, dated Oct. 29, 1993.

Primary Examiner—Timothy V. Eley
Assistant Examiner—Benjamin M. Halpern
Attorney, Agent, or Firm—Terry J. Anderson; Karl J. Hoch, Jr.

[57] ABSTRACT

A top load threaded bolt assembly (60) for restraining a workpiece (36) on a operating surface (32) of a tooling fixture (50) is provided. Top load threaded bolt assembly (60) includes a housing (66) having a bolt cavity (75) and a bolt passage (76) disposed within housing (66). A bolt (64) having a first threaded portion (70) is disposed within bolt cavity (75) such that first threaded portion (70) extends above a operating surface (32) of tooling fixture (50). The top load threaded bolt assembly (60) may be disposed in the operating surface (32) of tooling fixture (50). Top load threaded bolt assembly (60) may further include a conical spring (62) to bias bolt (64) in an extended position. Bolt (64) may be secured in a non-extended position by threading a second threaded portion (72) into a threaded passage (58) which is adjacent bolt cavity (75) and opposite bolt passage (76).

23 Claims, 3 Drawing Sheets

TOP LOAD THREADED BOLT ASSEMBLY

TECHNICAL FIELD OF THE INVENTION

This invention relates generally to tooling fixture restraining devices, and more particularly to a top load threaded bolt assembly for securing a workpiece to a tooling fixture for manufacturing operations.

BACKGROUND OF THE INVENTION

Numerous industries and applications use tooling fixtures to restrain a workpiece for manufacturing operations. Typical uses of tooling fixtures include securing and clamping raw stock to a machine for manufacturing operations, such as machining, milling, welding and other such manufacturing operations. In many cases the same tooling fixture is used throughout the various manufacturing operations. Tooling fixtures are also used on finished parts that are being assembled into subassemblies and final assemblies. Workpiece refers to the various parts that tooling fixtures restrain.

Existing methods to restrain a workpiece generally include clamping, bolting, or other forms of securing the workpiece to the operating surface of the tooling fixture. One such method uses bolts in which the threaded portion extends above the operating surface of the tooling fixture. These bolts reside in a cavity formed in the underside of the tooling fixture, and include a conical spring to bias the bolt in an extended position. A plug, accessible only from the underside of the tooling fixture, secures the bolt and spring in the cavity.

The workpiece to be secured typically includes threaded holes that align with the bolts extending from the tooling fixture. To secure the workpiece, a drive device engages a drive socket in the threaded portion of the bolt and rotates the bolt. The spring provides a biasing force to help the bolt engage the threaded hole in the workpiece. The drive device tightens the bolt, thereby securing the workpiece to the tooling fixture.

Existing bolt assemblies suffer from numerous disadvantages. One such disadvantage is that replacement of a damaged bolt requires removal of the tooling fixture/workpiece assembly from the machine or assembly tool to access the plug that secured the bolt in the cavity. This causes an interruption in the fabrication process, which may increase the time and cost to produce the finished product. In addition, replacement of damaged bolts may disturb the indexed orientation of the workpiece on the machine. In many cases, the workpiece will be scrapped due to the disruption. A further disadvantage with prior bolt assemblies is that unused bolts extend above the operating surface of the tooling fixture, thereby interfering with access to the workpiece and causing a safety hazard.

SUMMARY OF THE INVENTION

Accordingly, a need has arisen for an improved bolt assembly. The present invention provides a top load bolt assembly that addresses short-comings of prior bolt assemblies.

In accordance with the teachings of the present invention, an improved top load bolt assembly is provided. A tooling fixture incorporating a top load bolt assembly for restraining a workpiece may include a base having an operating surface. At least one bolt cavity is disposed within the base. A bolt passage is disposed between the base operating surface and each bolt cavity. A bolt having a first threaded portion is movably disposed within the bolt cavity and the bolt passage to allow the first is threaded portion to extend above the operating surface of the base and threadably restrain the workpiece. An access system is provided to install or replace the bolt from the base operating surface, thereby removing the need to remove the workpiece and tooling fixture from a machine.

Technical advantages of the present invention include providing a bolt assembly removable from the operating surface of the tooling fixture, thereby obviating the need to remove the workpiece and the tooling fixture from the machine. A damaged bolt can now be easily and quickly replaced without a substantial work stoppage and without the increased possibility of scrapping the workpiece. This is especially true with the tooling fixtures which include several hundred bolt assemblies which are heavy.

An additional technical advantage of the present invention is that the operator is no longer required to physically beat the plug out of the tooling fixture, thereby reducing the possibility of injury to both the operator and the expensive tooling fixture.

Another technical advantage of the present invention is that the bolt can be secured in a non-extended position to increase the access to the workpiece and to reduce the possibility of damage. In addition, with the removal of numerous bolts extended from the tooling fixture, the safety hazards of machine operators is reduced.

Other technical advantages will be readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and its advantages are best understood by referring in more detail to FIGS. 1–4 of the drawings, in which like numerals refer to like parts throughout the several views.

Figure 1:
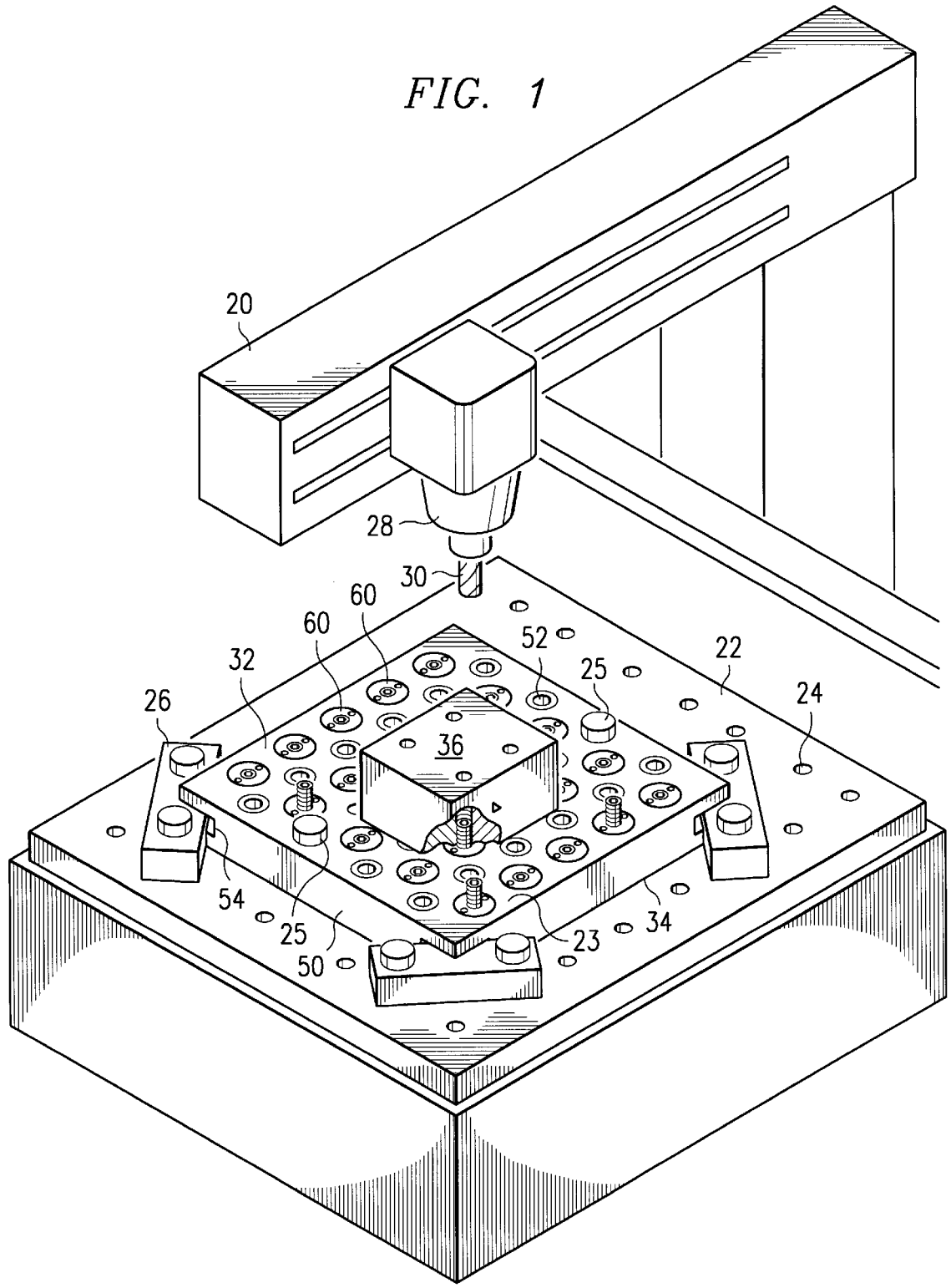
FIG. 1 is an orthographic drawing of a typical machining tool which includes a tooling fixture incorporating one embodiment of the present invention.

FIG. 1 illustrates a typical manufacturing milling machine 20 having a tool head 28 and mill cutter 30 for machining workpiece 36. Milling machine 20 includes machine bed 22 and bolt holes 24 for securing workpiece 36 and tooling fixture 50 to machine bed 22 at back surface 34. Tooling fixture 50 is provided with several features for securing tooling fixture 50 to machine bed 22. These features include clamp slot 54 in tooling fixture 50 in which clamps 26 are used to clamp tooling fixture 50 to machine bed 22. Tooling fixture 50 may also include bolt holes 52 in which bolts 25 are screwed into bolt holes 24 of machine bed 22 to secure tooling fixture 50 to machine bed 22.

Figure 2:
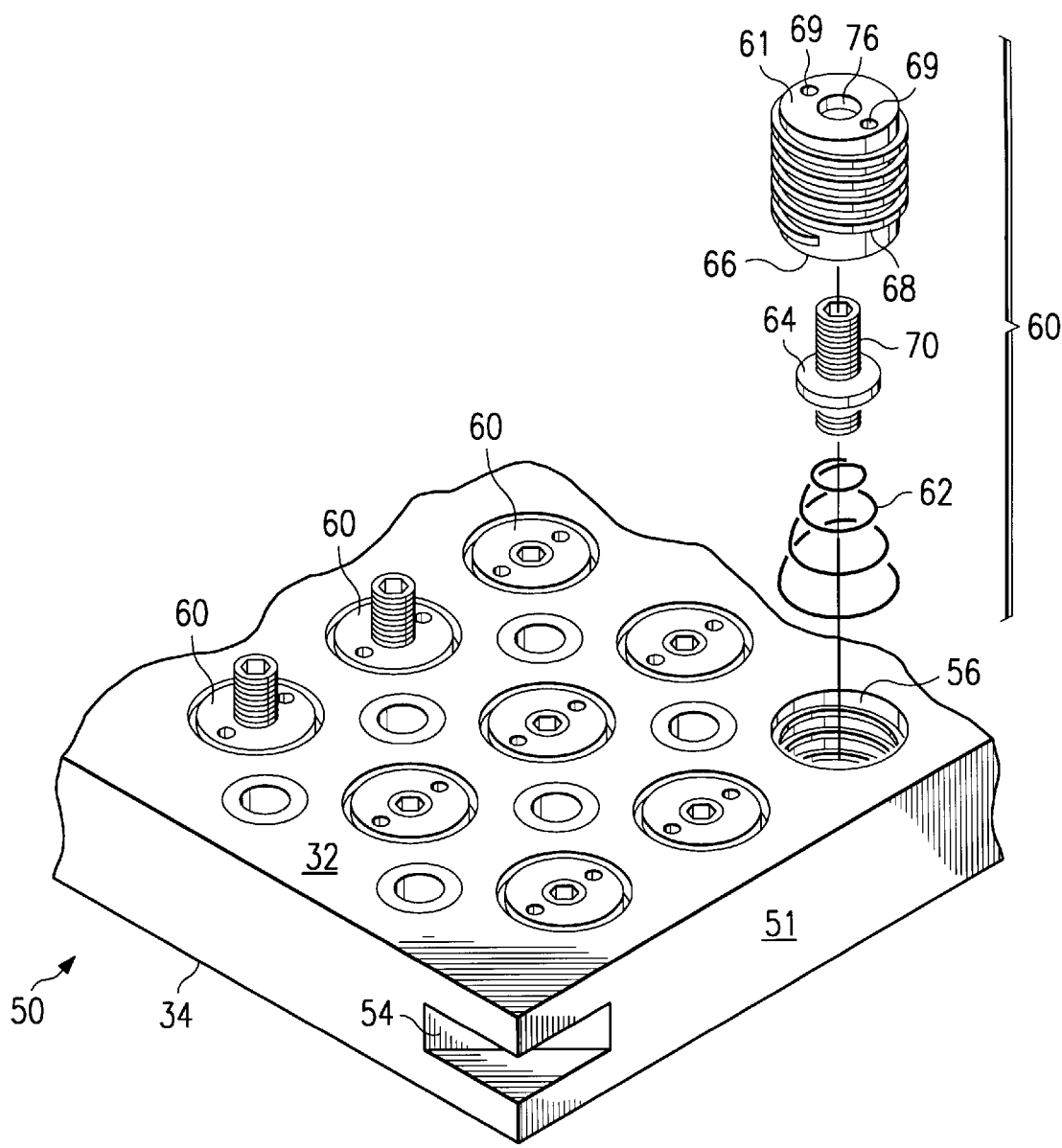
FIG. 2 is an exploded orthographic drawing in part of a tooling fixture according to one embodiment of the present invention.

FIG. 2 illustrates the components and assembly of tooling fixture 50. Tooling fixture 50 comprises bolt assembly 60 disposed within base 51. Bolt assembly 60 is shown in both the extended position (first threaded portion 70 of bolt 64 extended above operating surface 32 of tooling fixture 50) and the non-extended position (first threaded portion 70 of bolt 64 is even or below operating surface 32 of tooling fixture 50). Bolt assembly 60 may comprise housing 66, bolt 64, and conical spring 62. Housing 66 includes bolt passage 76 and assembly slots 69 located in first-end 61 of housing 66. The diameter of bolt passage 76 is related to the size of first threaded portion 70 of bolt 64. Threads 68 on the cylindrical surface of housing 66 may be left-handed threads and may be ACME threads for increased strength and ease of installation. A corresponding threaded cylindrical cavity 56 is disposed in base 51 for accepting housing 66.

Figure 3:
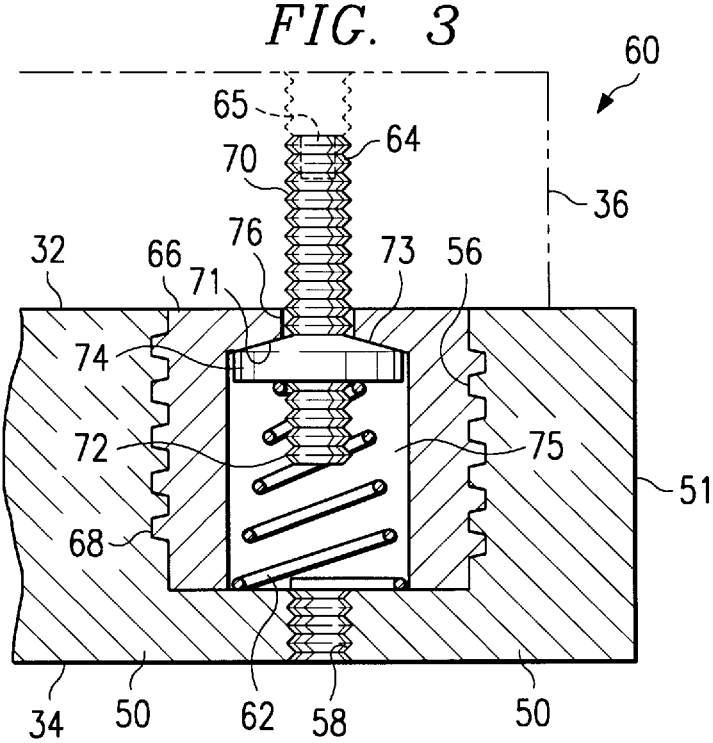
FIG. 3 is a schematic drawing in section with portions broken away of a tooling fixture according to one embodiment of the present invention.

FIG. 3 shows a cross section of an installed bolt assembly 60 in tooling fixture 50. Bolt cavity 75 is formed within housing 66. The diameter and length of bolt cavity 75 are related to the diameter of boss 74 and the length of bolt 64, respectfully. Housing 66 is threaded into threaded cylindrical cavity 56 until housing 66 bottoms onto base 51. Disposed within bolt cavity 75 is bolt 64 having first threaded portion 70, second threaded portion 72 and boss 74 disposed between first threaded portion 70 and second threaded portion 72. Conical spring 62 is disposed within bolt cavity 75 between boss 74 of bolt 64 and threaded passage 58 formed in base 51. Conical spring 62 acts on bolt 64 to bias bolt 64 in an extended position as shown in FIG. 3. To secure bolt 64 in a non-extended position, conical spring 62 is compressed and bolt 64 is rotated such that second threaded portion 72 of bolt 64 is threaded into threaded passage 58, thereby securing bolt 64 even or below the operating surface 32 of tooling fixture 50.

To secure workpiece 36 to operating surface 32 of tooling fixture 50, the required number and position of bolt assemblies 60 are extended. Workpiece 36 is placed on top of tooling fixture 50, compressing each bolt 64. The threaded bolt holes in workpiece 36 are aligned with the corresponding bolt 64. A drive device having an extension corresponding to drive socket 65 is used to rotate bolt 64. Conical spring 62 provides a biasing force on bolt 64 to extend bolt 64 into the threads of workpiece 36. Upon bolt 64 being tightened into workpiece 36, angled housing seat 73 contacts angled boss seat 71 to center bolt 64 and secure workpiece 36 to operating surface 32 of tooling fixture 50. Tooling fixture 50 can then easily be secured to machine bed 22 by use of clamps 26 or bolts 25.

Figure 4:
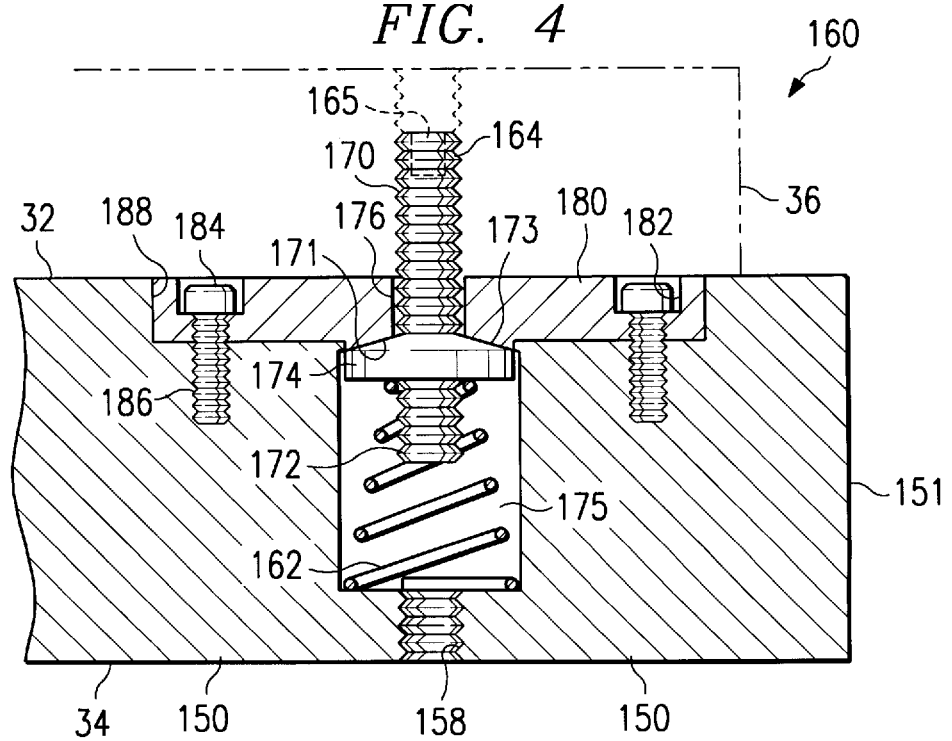
FIG. 4 is a schematic drawing in section with portions broken away of a tooling fixture according to another embodiment of the present invention.

FIG. 4 is a cross section of another embodiment of the present invention. Tooling fixture 150 comprises base 151 and bolt assembly 160 disposed within base 151. Bolt cavity 175 and recess 188 are formed in base 151. Disposed within recess 188 is plate 180 which is secured to base 151 using bolts 184 threaded into threaded bolt holes 186. Bolt recess 182 is formed in plate 180 to allow bolts 184 to be recessed at or below operating surface 32. Bolt passage 176 is formed in plate 180 between operating surface 32 and bolt cavity 175. Bolt 164 includes first threaded portion 170, second threaded portion 172, boss 174 disposed between first threaded portion 170 and second threaded portion 172, and drive socket 165 formed in the first threaded portion 170. Bolt 164 and spring 162 are disposed within bolt cavity 175. Spring 162 biases bolt 164 such that first threaded portion 170 extends through bolt passage 176 and above operating surface 32. Boss 174 includes seat 171 which contacts seat 173 formed in plate 180.

To secure bolt 164 in a non-extended position, conical spring 162 is compressed and bolt 164 is rotated such that second threaded portion 172 of bolt 164 is threaded into threaded passage 158, thereby securing bolt 164 at or below operating surface 32. The operation to secure workpiece 36 to operating surface 32 of tooling fixture 150 is similar to the earlier discussion.

Although the present invention and its advantages have been described in detail, it should be understood that various changes, substitutions, and alterations can be made therein without departing from the spirit and scope of the present invention as defined by the appended claims.

What is claimed is:

1. A tooling fixture for restraining a workpiece, the tooling fixture comprising:

a base having a base operating surface;

at least one bolt cavity enclosed within the base;

a bolt passage disposed between the base operating surface and each bolt cavity;

a bolt disposed in each bolt cavity, the bolt having a first threaded portion; and a bias system disposed below the base operating surface, the bias system operable to bias the first threaded portion through the bolt passage and above the base operating surface, the first threaded portion extending above the base operating surface to threadably restrain the workpiece.

2. The tooling fixture of claim 1, further comprising a bolt securing system to secure the bolt in a non-biased position.

3. The tooling fixture of claim 2, wherein the bolt securing system comprises:

a threaded passage adjacent the bolt cavity and opposite the bolt passage;

the bolt having a second threaded portion opposite the first threaded portion; and the second threaded portion of the bolt operable to threadably engage the threaded passage to secure the bolt in the non-biased position.

4. The tooling fixture of claim 1, further comprising a drive socket formed in the first threaded portion of the bolt.

5. A bolt assembly for use in a tooling fixture having an operating surface for a workpiece, the bolt assembly comprising:

a cylindrical housing having an outer circumference and a first-end corresponding to the operating surface of the tooling fixture;

threads formed on the outer circumference of the housing;

a bolt cavity formed within the cylindrical housing;

a bolt passage formed within the first-end;

a bolt having a first threaded portion, the bolt disposed within the bolt cavity; and a bias system disposed below the operating surface, the bias system operable to bias the threaded portion through the bolt passage and above the operating surface of the tooling fixture, the threaded portion extending above the operating surface of the tooling fixture to threadably restrain the workpiece.

6. The bolt assembly of claim 2, wherein the bias system comprises a spring.

7. The bolt assembly of claim 5, wherein the bolt further comprises:

a second threaded portion; and a boss disposed between the first threaded portion and the second threaded portion.

8. The bolt assembly of claim 5, wherein the bolt further comprises a drive socket formed in the first threaded portion of the bolt.

9. The bolt assembly of claim 8, wherein the drive socket is hexagonal.

10. The bolt assembly of claim 5, wherein the threads comprise left handed threads.

11. The bolt assembly of claim 5, wherein the threads comprise left-handed ACME threads.

12. A bolt assembly for use in a tooling fixture having an operating surface, the bolt assembly comprising:

a cylindrical housing having an outer circumference and a first-end corresponding to the operating surface of the tooling fixture;

threads formed on the outer circumference of the housing;

a bolt cavity formed within the cylindrical housing;

a bolt passage formed within the first-end; and a bolt having a first threaded portion, the bolt disposed within the bolt cavity such that the first threaded portion of the bolt extends through the bolt passage, wherein the bolt further comprises a boss having an angled seating surface to engage a corresponding angled seating surface formed in the bolt cavity adjacent the bolt passage.

13. The tooling fixture of claim 1, further comprising an access system for installing the bolt into the bolt cavity from the base operating surface.

14. A manufacturing machine layout to perform a workpiece fabrication operation, the manufacturing machine layout comprising:

at least one bolt assembly disposed in the tooling fixture, the bolt assembly having a first threaded portion, the bolt assembly further having a bias system operable to bias the first threaded portion above the operating surface to threadably secure the workpiece to the operating surface of the tooling fixture for the workpiece fabrication operation.

15. The manufacturing machine layout of claim 14, wherein the bolt assembly further comprises:

a cylindrical housing having an outer circumference and a first-end corresponding to the operating surface of the tooling fixture;

threads formed on the outer circumference of the housing;

a bolt cavity formed within the cylindrical housing;

a bolt passage formed within the first-end; and a bolt disposed within the bolt cavity the bolt including the first threaded portion, and wherein the first threaded portion extends through the bolt passage.

16. The manufacturing machine layout of claim 15, wherein the bolt further comprises:

a second threaded portion; and a boss disposed between the first threaded portion and the second threaded portion.

17. The manufacturing machine layout of claim 15, wherein the bolt further comprises a drive socket formed in the first threaded portion of the bolt.

18. The manufacturing machine layout of claim 14, further comprising a bolt assembly securing system operable to secure the bolt assembly in a non-biased position.

19. The manufacturing machine layout of claim 18, wherein the bolt assembly securing system comprises:

a threaded passage disposed in the tooling fixture opposite the operating surface:

a bolt including the first threaded portion, the bolt having a second threaded portion opposite the first threaded portion, the second threaded portion operable to threadably engage the threaded passage to secure the bolt assembly in a non-biased position.

20. The tooling fixture of claim 13, wherein the access system comprises:

a threaded cylindrical cavity extending into the base from the base operating surface;

a cylindrical housing having a first-end corresponding to the operating surface and threads formed on the outer circumference of the housing, the threads and size of the cylindrical housing matching the threads and size of the threaded cylindrical cavity;

the bolt cavity formed within the cylindrical housing; and the bolt passage formed within the first-end.

21. The tooling fixture of claim 20 wherein the threads of the threaded cylindrical cavity and the threads of the cylindrical housing are left-handed.

22. The tooling fixture of claim 21 wherein the threads are ACME threads.

23. The tooling fixture of claim 13, wherein the access system comprises:

a plate disposed between the base operating surface and the bolt cavity;

the bolt passage formed in the plate; and a fastener system to secure the plate to the base.

* * * * *